United States Patent [19]

Georgiou et al.

[11] Patent Number: 4,786,130
[45] Date of Patent: Nov. 22, 1988

[54] FIBRE OPTIC COUPLER

[75] Inventors: George A. Georgiou, London; Anthony C. Boucouvalas, Middlesex, both of England

[73] Assignee: The General Electric Company, p.l.c., England

[21] Appl. No.: 864,802

[22] Filed: May 19, 1986

[30] Foreign Application Priority Data

May 29, 1985 [GB] United Kingdom ............... 8513542

[51] Int. Cl.4 ............................ G02B 6/02; G02B 6/26
[52] U.S. Cl. .................................. 350/96.15; 350/96.29
[58] Field of Search ........................... 350/96.15, 96.29

[56] References Cited

U.S. PATENT DOCUMENTS

| | | | |
|---|---|---|---|
| 3,918,794 | 11/1975 | Milton | 350/96.15 |
| 4,493,528 | 1/1985 | Shaw et al. | 350/96.15 |
| 4,634,858 | 1/1987 | Gerdt et al. | 250/227 |
| 4,662,710 | 5/1987 | ten Berge | 350/96.29 X |
| 4,666,235 | 5/1987 | Pavlath | 350/96.15 |
| 4,679,894 | 7/1987 | Pavlath | 350/96.14 X |

FOREIGN PATENT DOCUMENTS

| | | | |
|---|---|---|---|
| 0059788 | 9/1982 | European Pat. Off. | 350/96.15 |
| 2853800 | 6/1980 | Fed. Rep. of Germany | 350/96.15 |
| 2507787 | 12/1982 | France | 350/96.13 |
| 0076307 | 6/1980 | Japan | 350/96.15 |
| 0057303 | 4/1985 | Japan | 350/96.15 |
| 2125179 | 2/1984 | United Kingdom . | |

OTHER PUBLICATIONS

Optics Letters, vol. 4, 1979, p. 29, S. K. Sheem & T. G. Giallorenzi.

Primary Examiner—William L. Sikes
Assistant Examiner—Akm E. Ullah
Attorney, Agent, or Firm—Kirschstein, Kirschstein, Ottinger & Israel

[57] ABSTRACT

A fibre-optic coupler has the claddings of two or more optical fibres partially fused together over a coupling region, and a body of light-transmissive material, having a variable refractive index, contacts the claddings at the coupling region, such that by varying the refractive index of said body light transmitted along one fibre is split between the fibres in a varying ratio.

14 Claims, 2 Drawing Sheets

FIBRE OPTIC COUPLER

BACKGROUND OF THE INVENTION

1. Field of the Invention

The present invention relates to fibre optic couplers of the type comprising two or more optic fibres with their claddings fused together at an intersection of the fibres so that light injected into one fibre is coupled into the other fibre at the intersection, and to optical devices utilising such couplers.

2. Description of Related Art

The splitting ratio is largely determined by the degree of fusion of the fibre claddings, the length of the fused portion at the intersection, the numerical aperture of the fibres and the separation between the fibre cores at the intersection. Such couplers can be made by the fused biconical-taper technique, which involves laying one lightly tensioned optic fibre over another lightly tensioned optic fibre so that the fibres are nearly parallel at their intersection, and heating the fibres at the intersection to partially fuse their claddings together whilst pulling the fibre ends to elongate the resulting fused coupling region at the intersection. The elongation of the coupling region may be adjusted to achieve a desired splitting ratio. Such a method is described in detail in published UK Patent Application No. 2,136,985A for example. In a variant of this technique, one or more optic fibres may be twisted around each other and the twisted region heated to fuse the claddings whilst the fibres are tensioned to form the waist in the fused region. Such a method is disclosed in published UK Patent Application No. 2,112,165A. The above published UK patent applications are hereby incorporated by reference.

Fibre-optic couplers have been widely used in telecommunications, and because it is obviously undesirable that the splitting ratio in such couplers should be affected by the environment, fibre-optic couplers for use in telecommunications systems generally incorporate claddings which are almost completely fused together at the fibre intersection and are usually potted in a suitable potting compound. We have found that fibre optic couplers which have hitherto been used as passive optical components with a fixed splitting ratio, can be used as active components in optical transducers.

SUMMARY OF THE INVENTION

According, therefore, to the present invention a fibre-optic coupler of the type referred to incorporates a body of light-transmissive material disposed in contact with said fused claddings at said coupling region, the refractive index of said body of light-transmissive material being variable so as to vary the splitting ratio at said coupling region. The term "light" is to be understood to include within its scope not only visible radiation but also any radiation which can be guided through optic fibres.

A coupler in accordance with the invention can be arranged to operate as a transducer, and in use of the coupler for this purpose means will be provided for injecting light along one of the fibres, and for detecting the splitting ratio by comparing the output from the fibres.

The transducer may incorporate controllable means for selectively varying the refractive index of the light-transmissive material so that the transducer may be used as an optical switch or power splitting to control the relative proportions of the injected light emerging from the optic fibres.

Alternatively however the means for varying the refractive index of the body of light-transmissive material may be arranged to be responsive to some independent variable (such as temperature or electric field for example) so that the transducer may be used as a sensor to detect and/or measure that variable.

Preferably, in use the refractive index of the light-transmissive material is similar to the refractive index of the fused fibre cladding at the coupling region.

The light-transmissive material may for example be a material whose refractive index is sensitive to temperature. The material may be exposed to ambient temperature and the splitting ratio monitored to measure the ambient temperature. Alternatively the material may be maintained at a desired temperature (and is preferably heated by a controllable heater) to control the splitting ratio of the coupler accordingly. Preferably said material is a liquid. In some cases the material may be chosen such that it undergoes a phase change (e.g. solidification/melting) at a certain temperature and changes its refractive index accordingly.

The light-transmissive material may be a liquid crystal or other material whose refractive index is sensitive to electric field. The transducer may incorporate means for applying an electric field to the material either in response to some external variable or as a control signal to control the splitting ratio of the coupler. The transducer may be in some cases be used to measure electric field directly. It will be appreciated that because transducers are available which (with suitable voltage amplification) can convert a variety of variables (e.g. sound, pressure, velocity) to an electric field, such transducers may be used in conjunction with the transducer of the present invention to generate an optical output. This optical output (namely two optical signals with a defined intensity ratio) can be readily transmitted over long distances via optic fibres and is immune from electrical interference.

The means for varying the refractive index of the light-transmissive material may be arranged to modulate the refractive index. For example it may comprise a piezoelectric transducer in contact with the light-transmissive material and arranged to modulate the refractive index by generating high frequency pressure waves therein.

The sensitivity of the transducer will depend on the proportion of the electromagnetic field generated by the light propagating through the coupling region which extends into the body of light-transmissive material. Thus the splitting ratio of a coupler in which the fibre claddings are barely fused together (so that the cross-section of the coupling region is considerably indented, e.g. into a figure of eight shape) will be much more sensitive to the refractive index of the light-transmissive material than that of a coupler in which the fibre claddings are thoroughly fused together to give a slightly indented or even an entirely convex cross-section at the coupling region. The former shape of cross-section is suitable for sensor applications while the latter shape is best suited for power splitting applications.

BRIEF DESCRIPTION OF THE DRAWINGS

Embodiments of the inventon will now be described, by way of example only, with reference to FIGS. 1 to 3 of the accompanying drawings, of which.

DETAILED DESCRIPTION OF THE PREFERRED EMBODIMENTS

Figure 1:
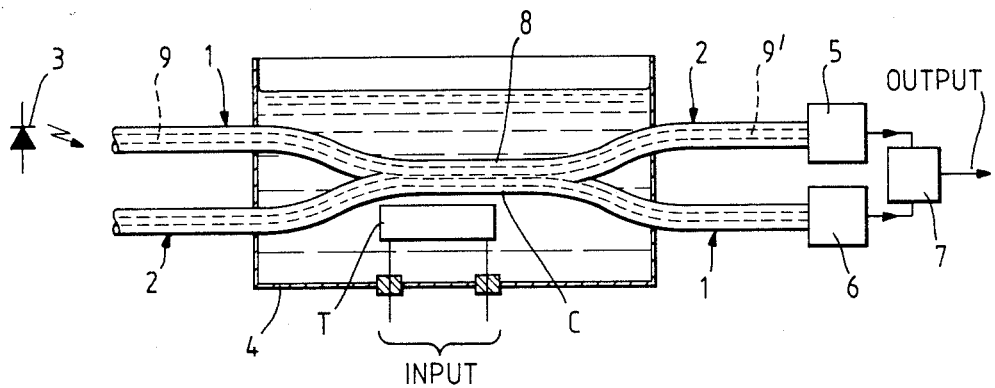
FIG. 1 is a schematic representation of a transducer comprising a coupler in accordance with the present invention.

Referring to FIG. 1, the transducer arrangement shown comprises a pair of monomode optic fibres 1, 2 which have been partially fused together by a fused biconical tapering technique or a similar technique to form a coupling region C. Light from a laser diode 3 is injected into the core 9 of optic fibre 1 and traverses coupling region C (which is approximately 16 mm in length) where some of the light is coupled via the fused cladding 8 of fibres 1 and 2 into the core 9' of optic fibre 2. Respective optical detectors 5 and 6 measure the light intensities emerging from fibres 1 and 2 and the detected intensities are compared in a comparator 7. The output of comparator 7 corresponds to the ratio of the optical intensity detected by detector 6 to the optical intensity detected by detector 5 and thus corresponds to the splitting ratio of the coupler formed by optic fibres 1 and 2.

The coupling region C of the coupler is immersed in a bath of light-transmissive material 4 such as silicone oil or a liquid crystal for example, which has a similar refractive index to that of the cladding 8. A modulator T in contact with light-transmissive material 4 causes the refractive index of this material to change in response to an appropriate input signal. Thus for example if light-transmissive material 4 is a liquid crystal then the modulator T may consist of a pair of electrodes spaced apart on opposite sides of coupling region C. The refractive index of the liquid crystal (which is preferably comparable to that of the fibre cladding 8) is sensitive to the electric field strength and therefore changes with the voltage of the input signal—thus the output from comparator 7 is modulated by the input to the modulator T. The input to the modulator T may be derived from any sensor (not shown) which generates an electrical signal in response to some variable such as pressure, velocity or temperature for example. It will be apparent that if detectors 5 and 6 and comparator 7 were dispensed with, and a controlled input signal where fed to the modulator T, then the coupler would behave as a tunable power splitter—i.e. the relative optical intensities emerging from optic fibres 1 and 2 could be controlled by varying the input signal. In such a case the modulator T could suitably be a heater and the light-transmissive material could suitably be a silicone oil, whose refractive index changes with temperature.

Figure 2A:
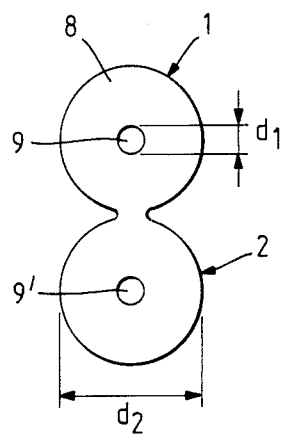
FIGS. 2(a) and 2(b) show cross-sections of two different couplers suitable for use as transducers in accordance with the invention.
Figure 2B:
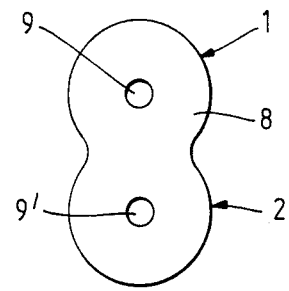
Figure 3A:
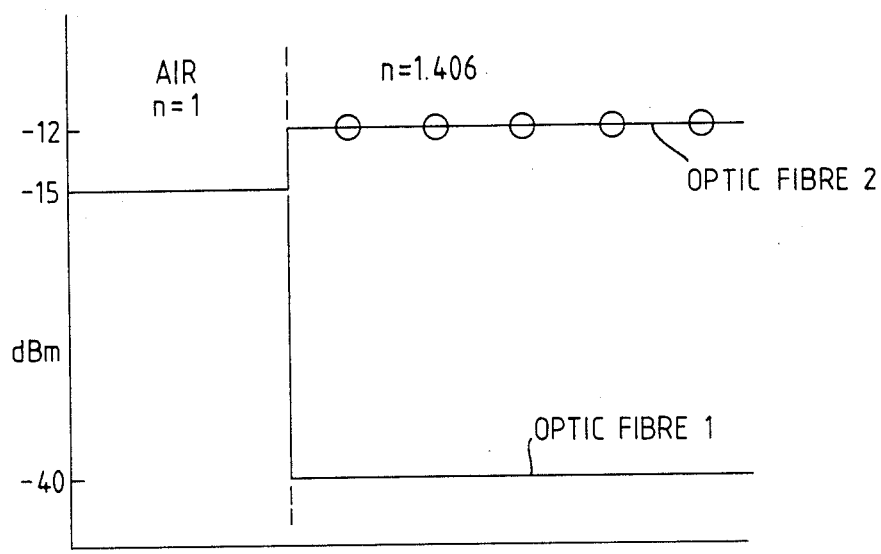
FIGS. 3(a) and 3(b) show plots of optical intensity: refractive index for the respective coupling cross-sections shown in FIGS. 2(a) and 2(b).
Figure 3B:
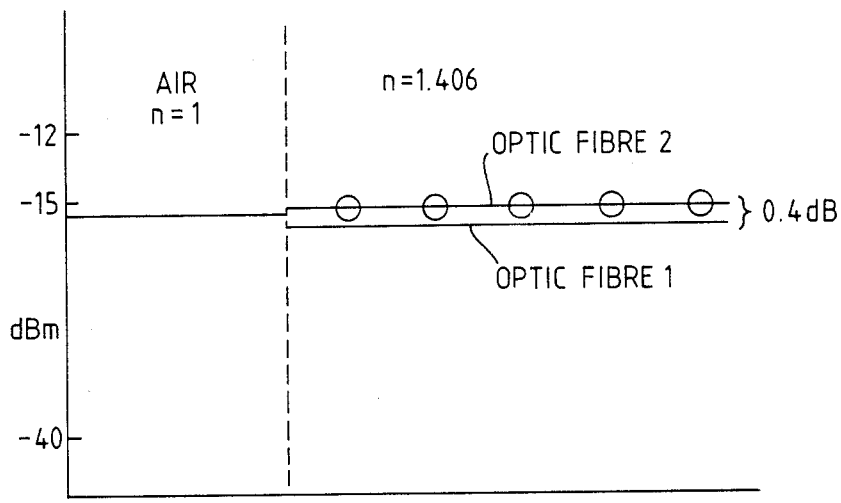

FIGS. 2(a) and 2(b) show two extremes of the degree of fusion in the coupling region C which may be utilised and FIGS. 3(a) and (b) show the corresponding splitting ratios. In each case the diameter $d_1$ of each fibre core 9 is 8 μm and the diameter $d_2$ of each cladding 8 is 125 μm. The refractive index of the cladding 8 is 1.447 at 1.3 μm wavelength. Cross-section in FIG. 2(a) was achieved by using a cold flame and a fast pulling speed (1 mm/s) in a fused biconical tapering technique to form a coupling between two optic fibres. Cross-section in FIG. 2(b) was achieved by using a hot flame and a slow pulling speed (250 μm/s) in a similar technique using fibres of the type referred to above, and is typical of the cross-sections in commercially available telecommunications couplers. Because a large proportion of the electromagnetic field propagating between the cores 9,9' in the coupling region C (FIG. 1) propagates outside the cladding 8 in the cross-section of FIG. 2(a), the refractive index of the surrounding material 4 has a considerable effect on the splitting ratio. Thus FIG. 3(a) shows optical power levels of −12 dBm and −40 dBm in fibres 2 and 1 respectively when light-transmissive material 4 has a refractive index of 1.406 and a coupling region 16 mm long and of cross-section FIG. 2(a) is utilized. FIG. 3(b) shows a difference of only 0.4 dBm between the power levels in a similar arrangement utilizing cross-section FIG. 2(b).

We claim:

1. A fibre-optic coupler of the type comprising at least two optic fibres, each having a central core surrounded by a cladding of lower refractive index and in which the claddings of the optic fibres are fused together over part of their length to define a fused biconical coupling region such that light injected along one of the fibres into the coupling region is split between the fibres, wherein a single body of light-transmissive material is disposed in contact with the fused claddings at the coupling region, the refractive index of the body being variable in response to changes in temperature so as to vary the splitting ratio at the coupling region.

2. A coupler according to claim 1 in combination with controllable means for selectively varying the refractive index of the body of light-transmissive material.

3. A coupler according to claim 2 wherein the body is disposed so as to be responsive to ambient temperature, and the coupler is associated with means for monitoring the splitting ratio so as to provide an indication of the ambient temperature.

4. A coupler according to claim 2 wherein the body is associated with controllable heating means for selectively heating the body of light-transmissive material.

5. A coupler according to claim 1 in which the fibre claddings are fused together at only a small portion of their circumferences so that the cross-section of the fibres at the coupling region is of a figure of eight shape.

6. A coupler according to claim 1 wherein the fibres are monomode optic fibres.

7. A coupler according to claim 1 in combination with means for injecting light along one of the fibres into the coupling region, and means for comparing the output from the fibres to determine the splitting ratio at the coupling region.

8. A fibre-optic coupler of the type comprising at least two optic fibres each having a central core surrounded by a cladding of lower refractive index and in which the claddings of the optic fibres are fused together over part of their length to define a fused biconical coupling region such that light injected along one of the fibres into the coupling region is split between the fibres, wherein a single body of light-transmissive material is disposed in contact with the fused claddings at the coupling region, the refractive index of the body being variable in response to changes in the strength of an applied electric field so as to vary the splitting ratio at the coupling region.

9. A coupler according to claim 8, wherein the body of light-transmissive material is a liquid.

10. A coupler according to claim 9, wherein the body of light-transmissive material is a liquid crystal.

11. A coupler according to claim 9, wherein the body of light-transmissive material is silicon oil.

12. A coupler according to claim 9 in combination with means for injecting light along one of the fibres into the coupling region and means for comparing the output from the fibres to determine the splitting ratio at the coupling region.

13. A combination according to claim 12, which combination includes means for applying a variable electric field to the material in response to an external variable.

14. A combination according to claim 12, which combination includes means for applying a variable electric field to the material as a control signal to control the splitting ratio of the coupler.

* * * * *